April 11, 1944.   J. KAMLET   2,346,261
TITRATION REACTION VESSEL
Filed Sept. 28, 1940
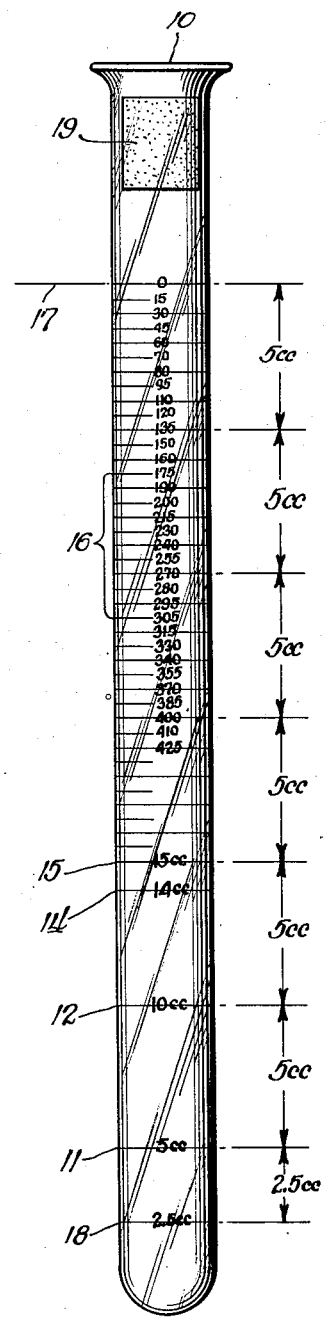
Inventor:
Jonas Kamlet.

Patented Apr. 11, 1944

2,346,261

UNITED STATES PATENT OFFICE 2,346,261

TITRATION REACTION VESSEL

Jonas Kamlet, Brooklyn, N. Y., assignor to Miles Laboratories, Inc., Elkhart, Ind., a corporation of Indiana Application September 28, 1940, Serial No. 358,861

1 Claim. (Cl. 23—292)

The present invention relates generally to laboratory apparatus and methods, and in particular to a vessel in which a specimen to be tested may be placed which requires eventually a titration for determining a component thereof, and in which the titration may be performed, the vessel serving to indicate the titer.

Heretofore, where titrations in the laboratory are made, they have been made from a pipette or burette, the use of which must be attended with use of other measuring equipment for preparing the liquid to be titrated. In the use of a burette, for example, it is usually necessary to take the difference between two readings to secure the titer. Where standard burettes are used, the value so read must be converted by some table or factor, for securing the final figure. Where a pipette is used, it is commonly filled to the zero mark and then only one value is read. This value also requires conversion. However, the use of a pipette with a finger stop may, through carelessness, easily lead to an error.

Where several determinations are made at once in using burettes or pipettes, there is danger of error in keeping notes and specimens coordinated, and also danger from other errors in preparing the plurality of specimens.

The present invention aims to simplify laboratory work, both in methods and apparatus, whereby a single vessel may be associated with a given sample to limit the amounts of specimen, reagents required, and directly to indicate the titer, or the report figure, and therefore give greater assurance of accuracy in reporting.

It is an object of the present invention to provide a reaction vessel calibrated to indicate a titer value.

It is another object of the invention to provide calibrations for the titer which read directly in terms required by the report to be made.

It is a particular object of the invention to provide a titration-reaction vessel for determining reducible carbohydrates or sugars, in fluids, particularly body fluids, such as blood, urine and spinal fluids, which vessel is calibrated with reference to a standardized procedure, the calibrations including one to limit the volume of the specimen, another to limit the volume of a reagent, and a series of them to indicate a titer value.

Various other and ancillary objects and advantages of the invention will become apparent from the following description and explanation of the invention as it is described with reference to the accompanying drawing in which:

The single figure represents a calibrated vessel in the general shape of a test tube.

It is to be understood that the invention may be applied to many laboratory tests by those skilled in the art, and that it is not limited in its application to the specific testing method herein given to illustrate in detail the nature of the invention and of the apparatus.

Reference is made to the generally well known type of test for reducing sugars, wherein a prepared copper-containing solution is subjected to reaction with a specimen containing sugar, under conditions to form insoluble cuprous oxide in quantity theoretically proportional to the amount of reducing sugar present. The test for a quantitative value is continued by determining the amount of copper oxide volumetrically by a final titration. The reactions involve use of a given quantity of liquid containing a definite amount of releasable free iodine, which is released in the procedure, and is then partly utilized by the cuprous oxide, leaving titratable residue of free iodine. This residue is removed by titration, the titer value being then subtracted from the said definite amount of releasable iodine employed, to give the amount used by the cuprous oxide, and hence to give a value equivalent to the sugar present.

Numerous standardized procedures embody these reactions and for the present purposes of illustration there is here given the one known as the Haskins and Holbrook modification of the Shaffer-Hartman method. See Northwest Medicine, (1924) volume 23, page 355, and American Journal for the Medical Sciences (1926), volume 172, page 256.

According to this method the liquid to be tested, such as urine, blood or spinal fluid is prepared in a standard way. In the case of blood deproteinized blood filtrate (such as Folin-Wu blood filtrate) is used, only 5 cc. being taken for the standard procedure.

The process provides a standardized solution made according to precise directions, from distilled water, sodium carbonate, copper sulfate, tartaric acid, potassium iodide, potassium iodate, and potassium oxalate. This is referred to as solution A, it being very important that it is standard with respect to releasable iodine.

Solution B is standardized in content of sodium tungstate.

Solution C is standardized in sulfuric acid content.

Solution D is standardized in sodium thiosulfate and sodium carbonate.

Solution E is a soluble starch solution for use as an indicator, to provide starch which turns blue in the presence of free iodine.

In the case of blood, the test calls for use of 2 cc. of oxalated or citrated whole blood, to which 15 cc. of water is added. On standing five minutes 2 cc. of solution B and 1 cc. of solution C are added. The liquid is vigorously agitated and let stand for 10 minutes and then filtered, to give the specimen to be tested as follows:

According to the test procedure, 5 cc. of the prepared specimen is taken. Then to this is added 5 cc. of the alkaline solution A. The mixture is placed on a boiling water bath for 15 minutes, which causes precipitation of cuprous oxide in amount equivalent to sugar present. Cool to 30° to 40° C. Then add 4 cc. of solution C, which releases free iodine, a part of which oxidizes the cuprous oxide to copper sulfate. The residue of iodine colors the solution and is titratable quantitatively by use of solution D in the presence of some of starch solution E to indicate the end of the titration. Practically, the titration is carried out first without the starch until only a pale straw color from iodine remains. Then 1 cc. of the solution E is added to produce the blue indicator color. The solution D is added slowly until the blue color is discharged. The amount of solution D added indicates the residual iodine, and is converted to terms indicating the amount of sugar.

Ordinarily, the foregoing test may be carried out by precisely pipetting the essential amounts of specimen, and of solution A, approximately measuring the amounts of solution C and solution E, and precisely measuring the titer of solution D. This will require three precise measuring pieces of apparatus and one or two precise or approximate measures.

By means of the present invention, but one measuring piece of equipment need be used. By reference to the drawing, it will be seen that the tube 10 is calibrated for the procedure given above. For convenience a simple test-tube is used, so that it may be heated. It is sufficiently large in diameter to provide legible titer calibrations. Following the procedure above given, the prepared specimen is added up to the 5 cc. mark indicated at 11. Then solution A is added up to the 10 cc. mark indicated at 12. Then the tube is heated for the required 15 minutes by inserting into boiling water, the tube being plugged with cotton. It is then removed and cooled to 30° to 40° C. Then solution C is added up to the 14 cc. mark indicated at 14. Now, the tube contains free iodine to be titrated. The mark indicated at 15 (15 cc.) is intended to serve as the true level of the fluid to be titrated so that the reading of a series of calibrations 16 will indicate the titer. The starch solution may be added to the 15 cc. mark before the titration is begun.

Practically, the test is better carried out by delaying the addition of starch until just before completing the titration. Hence it is an optional procedure to begin the titration at the 14 cc. level, and later, precisely pipette into the vessel 1 cc. of the starch solution.

The calibrations 16 are made to read in terms of milligrams of sugar in 100 cc. of the specimen, as to be reported. Hence, their legends read downwardly. If no sugar is present, no cuprous oxide forms, and all the releasable iodine of the 5 cc. of solution A will require a precise amount of solution D in the titration. This will bring the level of the liquid added by titration to a definite height from point 15 (15 cc.) or to a zero mark (shown in the drawing of the device practically employed). Its approximate position is indicated by dotted line 17. The tube is calibrated from line 17 to 15, in any convenient manner, and against the calibrations are placed legends reading as required by the test.

In practice the calibrations are made at regular volume units of 0.5 cc. for the test described. Against these are placed the legends. The legends need not be precisely related to the position of the calibration, it being practically sufficient to place approximate figures, in order to report in terms of 5 and 10 milligrams of sugar.

The drawing accordingly shows a variation in the regularity between the legends and the equal-volume calibrations. This regularity may depend also upon variations in the accuracy of the procedure. It is well known that a fixed procedure may vary in accuracy according to the amount of material present for determination. This is commonly gaged by calibrating the procedure against known solutions. Such calibration may be embodied in the tube by use of the appropriate precise or approximate legends on the illustrated equal-volume calibrations. In the test herein described, oxidation by air of cuprous oxide, is a factor affecting the test.

The calibrations and the legends may vary in other ways from a precise relationship indicated by a theoretical analysis of the procedure.

It is also to be understood that the shape of the tube may vary, and that it need not be uniform in cross-section. Any special shapes, or a deviation from a true cylinder, may be compensated for in the calibration of the tube.

The invention involves the use of a volumetrically calibrated tube for a titration procedure, with a mark for the true liquid level, or equivalent, at the beginning of the titration, such that upon completing the titration, the titer may be read by the final volume in the vessel. In its most practical form, the lines for final levels are calibrated in accordance with the procedure, to indicate directly the value to be reported.

It is also to be understood that those skilled in the art may deviate from the prescribed use of the device. For example, the following deviation is contemplated. Where a high sugar content is contemplated, such as in excess of 400 milligrams per 100 cc., the original specimen taken is diluted 100%. Accordingly, only 2.5 cc. of specimen is added, and then 2.5 cc. of water, making the 5 cc. of liquid to be present prior to adding solution A. Thus, in practice the tube is also calibrated at the 2.5 cc. level as indicated at 18.

The apparatus and its use is of great advantage where numerous specimens are being tested. Each tube itself may have a ground glass area 19 thereon for identifying the specimen. A set of such tubes may then be treated in the same way and titrated, keeping no records of the work during the procedure. Then when the report is to be made the identifications and the final readings are taken from the series with a minimum danger of errors from personnel.

The invention may be applied to other procedures, and the vessel may be variously calibrated, and changes and modifications are comprehended within the scope of the appended claim.

This application is a continuation in part of my copending application Serial No. 292,256, filed August 28, 1939.

I claim:

A titration-reaction vessel for the determination of sugars in liquid specimens comprising an elongated tube of transparent material having a closed bottom end and an opening remote therefrom for the introduction of liquids, said tube having calibration marks with identifying numerical data thereon each in position to indicate the meniscus of the liquid in the tube, one mark from the bottom indicating 5 volume units of liquid in the tube, the next mark above indicating 10 volume units of liquid in the tube, the mark next above indicating 14 volume units of liquid in the tube, the mark next above indicating 15 volume units of liquid in the tube, and in addition to said calibration marks a series of titrating marks indicating a constant volume increase in the same volume units above the said 15 volume unit mark, said series of marks of constant volume increase being related to specific numerals applied to the tube, said numerals decreasing upwardly in aritämetic value within the range of the series, each numeral indicating a content-value of sugar in the specimen by measuring the final volume of liquid in the tube resulting from adding a sufficient quantity of a titrating solution to give the known end point.

JONAS KAMLET.